US007070638B2

(12) United States Patent
Jeanfreau

(10) Patent No.: US 7,070,638 B2
(45) Date of Patent: Jul. 4, 2006

(54) BURP GAS FILTERING AND DEODORIZING DEVICE

(76) Inventor: Bryan S. Jeanfreau, 112 Espero Dr., Natchez, MS (US) 39120

( * ) Notice: Subject to any disclaimer, the term of this patent is extended or adjusted under 35 U.S.C. 154(b) by 237 days.

(21) Appl. No.: 10/730,915

(22) Filed: Dec. 10, 2003

(65) Prior Publication Data
US 2004/0128962 A1    Jul. 8, 2004

Related U.S. Application Data

(60) Provisional application No. 60/437,752, filed on Jan. 3, 2003.

(51) Int. Cl.
  B01D 46/00    (2006.01)
  B01D 53/02    (2006.01)
  B43K 29/00    (2006.01)

(52) U.S. Cl. .......................... 55/385.1; 55/486; 55/498; 55/502; 55/512; 55/516; 55/527; 55/528; 55/499; 96/11; 96/108; 96/134; 401/208; 401/213; 401/241; 401/243; D19/45

(58) Field of Classification Search ............... 55/385.1, 55/482, 486, 487, 497, 498, 502, 503, 512, 55/516, 522, 527, 528, 499; 96/4, 11, 108, 96/134, 138, 151, 153; 401/208, 209, 213, 401/217, 221, 222, 242, 243, 245; 131/202, 131/207, 331; 422/83, 84, 88; 436/132, 436/900; D19/41, 45, 54
See application file for complete search history.

(56) References Cited

U.S. PATENT DOCUMENTS

| 2,116,706 | A | * | 5/1938 | Meohas ..................... 131/202 |
| 3,533,414 | A | | 10/1970 | Beam |
| 3,830,244 | A | | 8/1974 | Luke |
| 4,080,170 | A | * | 3/1978 | Borkenstein ................. 422/84 |
| 4,250,901 | A | * | 2/1981 | Yamaguchi ................. 131/202 |
| 4,350,037 | A | | 9/1982 | Higham |
| 4,369,798 | A | * | 1/1983 | Jackson ...................... 131/202 |
| 4,370,988 | A | * | 2/1983 | Terasaki ..................... 131/202 |
| 5,171,535 | A | * | 12/1992 | Lamont ....................... 422/84 |
| 5,224,975 | A | | 7/1993 | Purnell et al. |
| 5,496,740 | A | * | 3/1996 | Williams ..................... 422/84 |
| 5,794,303 | A | * | 8/1998 | Sanfilippo et al. ............ 15/344 |
| 6,231,643 | B1 | | 5/2001 | Pasic et al. |
| 6,345,625 | B1 | | 2/2002 | Chew |
| 6,395,046 | B1 | | 5/2002 | Emig et al. |
| 6,858,182 | B1 | * | 2/2005 | Ito et al. ....................... 422/84 |
| 2003/0082794 | A1 | | 5/2003 | Haridas et al. |

OTHER PUBLICATIONS

"Purafil Chemisorbant Media For removal of toxic, odorous, and corrosive gases," Purafil Publications Internet Website, Purafil, Inc., Doraville, GA., 2003.

* cited by examiner

Primary Examiner—Jason M. Greene
(74) Attorney, Agent, or Firm—Richard C. Litman

(57) ABSTRACT

The burp filtering device has the body of a writing pen, with an intake port at the upper end of the body, a plurality of exhaust ports adjacent the writing tip, and a filter disposed within the body. The filter may be made of activated charcoal or other media for filtering eructation odors. In use, the user holds the upper end of the pen body to his lips, releases the suppressed burp, and the filtered gas is exhausted through the ports at the writing tip.

19 Claims, 9 Drawing Sheets

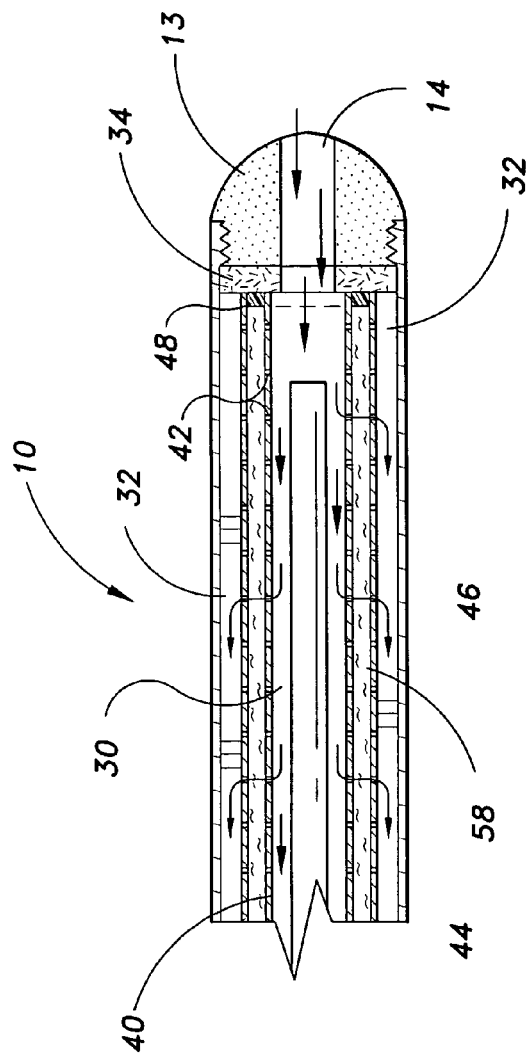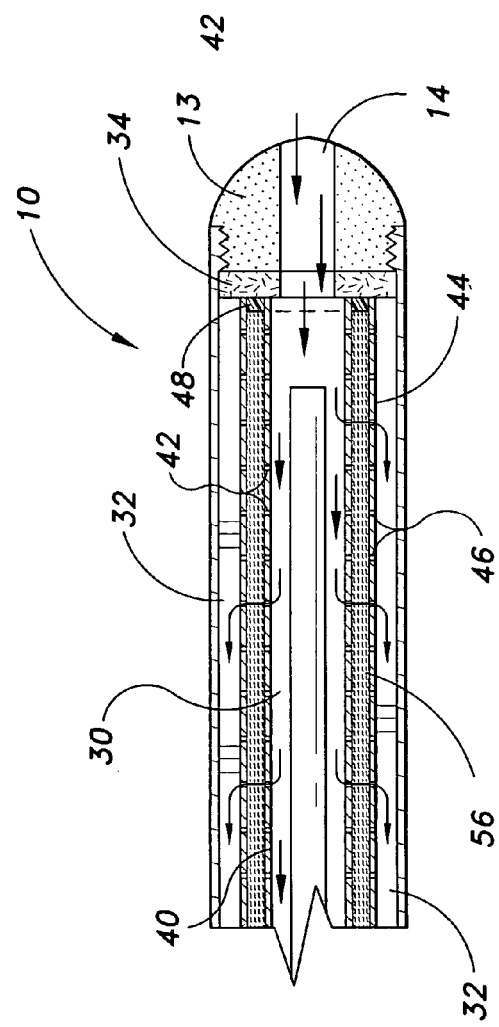

BURP GAS FILTERING AND DEODORIZING DEVICE

CROSS-REFERENCE TO RELATED APPLICATION

This application claims the benefit of U.S. Provisional Patent Application Ser. No. 60/437,752, filed Jan. 3, 2003.

BACKGROUND OF THE INVENTION

1. Field of the Invention

The present invention relates generally to air and gas filtration devices, and more particularly to personal filtration devices for eliminating eructation, or burp, odor.

2. Description of the Related Art

Burp or eructation odors have been a source of annoyance or concern in polite society for hundreds of years. Far too often, the foods that we love most cause us to belch. To the person who is belching, the odor may be a trifling annoyance, especially if the burp was the result of an enjoyable meal. However, for persons in the close vicinity of the burp, the burp is simply an unpleasant odor of someone else's partially digested food. Many people wish to eliminate the burp odor so as to avoid offending others.

Numerous methods have been devised to address the burp odor problem. Foremost among the proposed solutions are counteracting scents. These counteracting scents, such as peppermint or cinnamon candies, act to mask the burp odor with a stronger, more dominant or pleasant scent. However, the burp odor remains beneath, barely hidden, unaltered and simply masked. Another attempt to eliminate burp odor involved the use of chemicals.

Chemicals were used to alter or bind the most offensive chemicals, particularly those compounds containing sulfur, and render them harmless. These efforts were an attempt to create a burp without odor, or to eliminate the burp altogether. These efforts failed because of the tremendous number of different chemicals that are capable of creating offensive odors, and because of the numerous sources of gas that are present in the foods we eat. In addition, one must take care in using the various chemical methods of burp control.

The various chemical methods for controlling the odor of burps may not be harmless. The seemingly innocuous peppermints are now known to affect the operation of sphincters within the digestive tract. The more complex odor, gas, and acid controlling chemicals may have long-term effects that are still unknown. Thus, the next logical step is to eliminate the odor of a burp outside of the body. That is, as the burp is expelled. Thus, what is needed is a personal burp-filtering device that neutralizes burp odors quickly and is discreetly portable for use in any social setting.

U.S. Pat. No. 3,533,414, issued to Jon W. Beam on Oct. 13, 1970, teaches a mechanical tobacco smoke filter for use in conjunction with a tobacco rod suitable for smoking.

U.S. Pat. No. 3,830,244, issued to John A. Luke on Aug. 20, 1974, discloses tobacco-smoke filters for use in conjunction with tobacco products.

U.S. Pat. No. 4,350,037, issued to Peter Higham on Sep. 21, 1982, teaches a personal gas monitor. However, the device does not require intake or exhaust ports, but instead measures gas passively. Further, the device does not filter the air, but collects samples of impurities for monitoring.

U.S. Pat. No. 5,224,975, issued to Purnell et al. on Jul. 6, 1993, discloses a litter box deodorizer. However, the device does not require a user to provide airflow through the device. It is a passive, porous container for holding deodorizing materials.

U.S. Pat. No. 6,345,625 B1, issued to Kar Eng Chew on Feb. 12, 2002, teaches a filter for secondary smoke and smoking articles incorporating the same, the device being a single-purpose and incapable of performing other functions.

U.S. Pat. No. 6,395,046 B1, issued May 28, 2002, to Emig et al. describes a filter having nano non-woven tissue.

U.S. Pat. No. 6,231,643 B1, issued May 15, 2001, to Pasic et al. describes the use of woven nano filter material for removal of molecules such as $NO_x$ and $SO_x$ from a gas.

U.S. Patent Publication No. 2003/0082794 A1, published May 1, 2003, for Haridas et al., describes a biological filter for the purification of waste gases.

The brochure "Purafil Chemisorbant Media for removal of toxic, odorous, and corrosive gases" available from Purafil, Doraville, Ga. as taken from their Internet Website describes granular chemisorbants useful for removal of contaminant gases by adsorption, absorption, and chemical reaction.

None of the above inventions and patents, taken either singly or in combination, is seen to describe the instant invention as claimed.

SUMMARY OF THE INVENTION

The burp filtering device has the body of a writing pen, with an intake port at the upper end of the body, a plurality of exhaust ports adjacent the writing tip, and a filter disposed within the body. The filter may be made of activated charcoal or other media for filtering and adsorbing or absorbing eructation odors. In use, the user holds the upper end of the pen body to his lips, releases the suppressed burp, and the filtered, deodorized gas, is exhausted through the ports at the writing tip.

Accordingly, it is a principal object of the invention to provide a device that neutralizes burp odors.

It is another object of the invention to provide a device as above for eliminating burp odors that does not require the user to ingest chemicals.

It is a further object of the invention as above to provide a device for eliminating burp odors that is portable and discreet.

Still another object of the invention is to provide a device for eliminating burp odors that also serves as a writing instrument.

Yet another object of the invention is to provide a device as above having a replaceable filter.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 9 is a fragmented, elongated sectional view similar to that of FIG. 8 having a layered membrane filter.

FIG. 10 is a fragmented, elongated sectional view similar to that of FIG. 9 having an amorphous nanofilter or the like.

Similar reference characters denote corresponding features consistently throughout the attached drawings.

DETAILED DESCRIPTION OF THE PREFERRED EMBODIMENTS

The present invention is a burp-filtering device, more specifically a burp-filtering and deodorizing pen. The burp-filtering pen includes a generally tubular pen housing, an intake port, a plurality of exhaust ports, a pen tip, ink cartridge, and filtration media.

Figure 1:
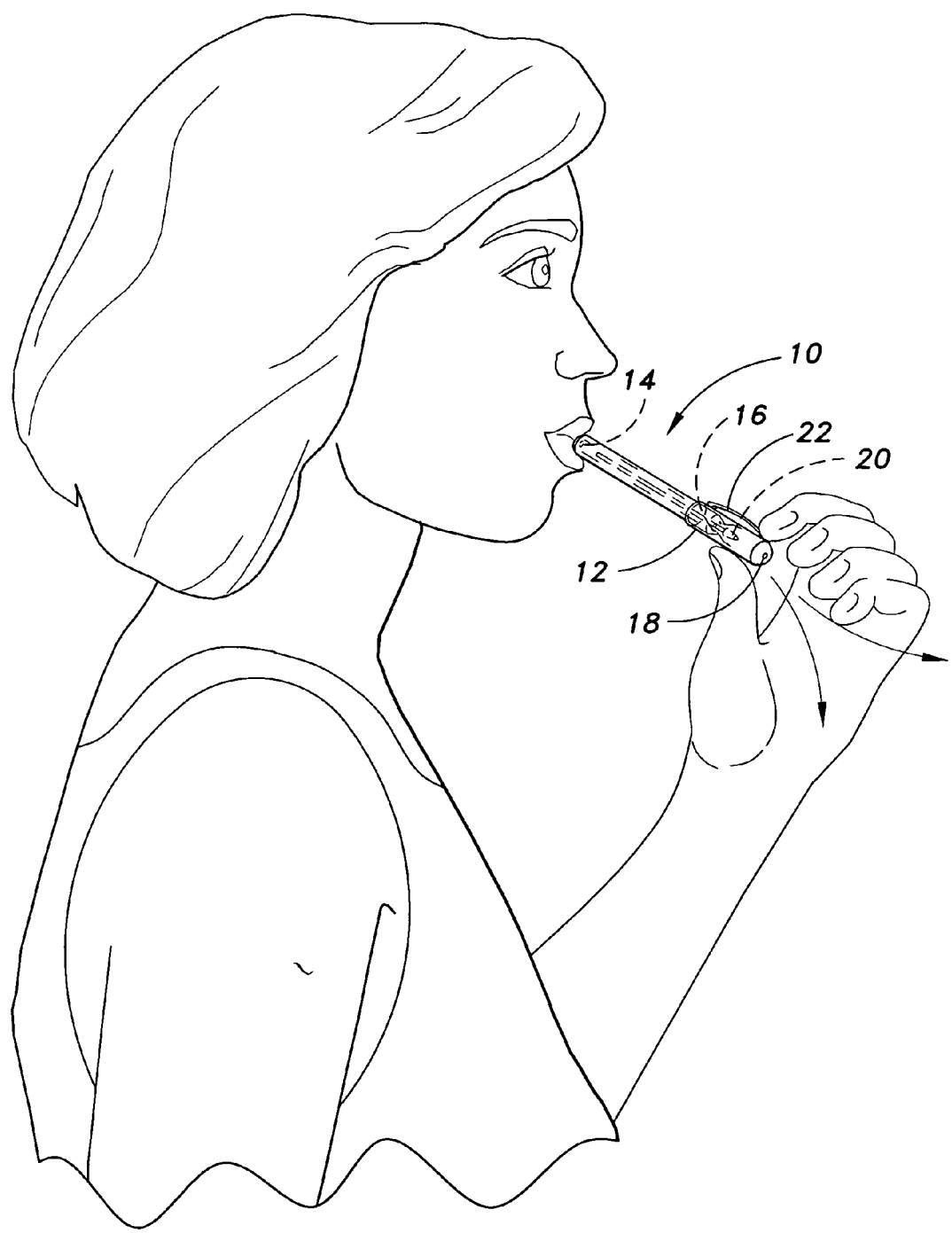
FIG. 1 is an environmental, perspective view of a burp filtering device according to the present invention.

Referring to FIG. 1 there is shown a burp filtering pen in use. In the preferred embodiment, the pen 10 has a generally tubular housing or body wall 11 having an upper end 13 having an intake port 14 extending axially therethrough, affixed to the pen housing 11. A plurality of exhaust ports 16 are defined at a lower end of the pen housing 11. Pen 10 has a pen cap 12 attached in place over the writing tip 20 and the plurality of exhaust ports 16 spaced above writing tip 20. Pen 10, as shown, with pen cap 12 in place is in the normally closed position. The user holds the burp-filtering pen to his or her mouth as a burp is occurring. The user exhales the burp gas through the mouth, and not the nose, and directs the burp gas through the intake port 14 of the burp-filtering pen. The burp gas is filtered and deodorized inside the pen housing 11 and flows out the plurality of exhaust ports 16. In one embodiment, the burp-filtering pen includes a pen cap 12. The pen cap 12 has a cap port 18 to allow filtered gas from the plurality of exhaust ports 16 to escape. The pen cap 12 may have a pocket clip 22 affixed to it to permit the user to securely store the burp-filtering pen in a pocket.

Figure 2:
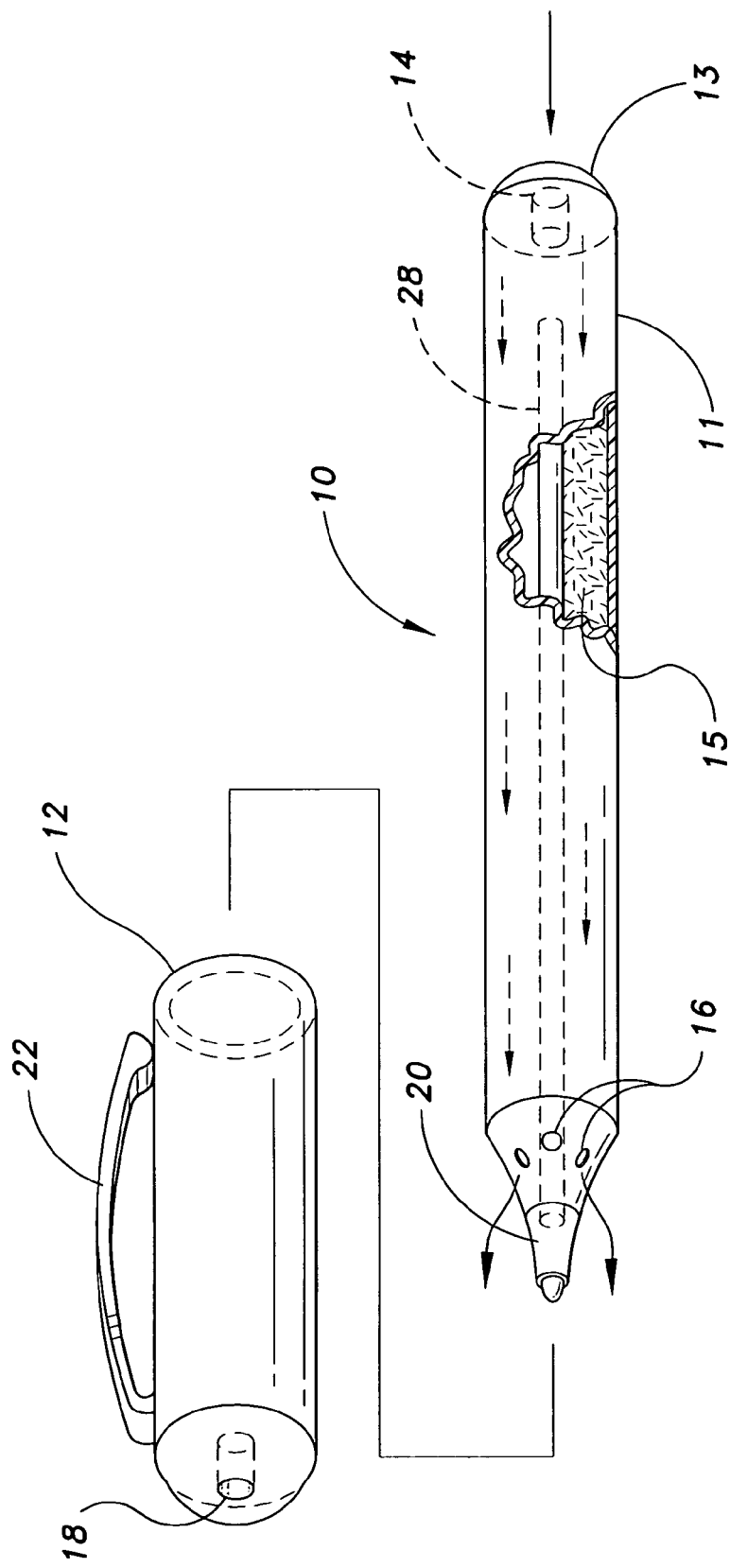
FIG. 2 is a side perspective, view of a burp filtering device as in FIG. 1 with the cap removed and the housing wall partially broken away.
Figure 3:
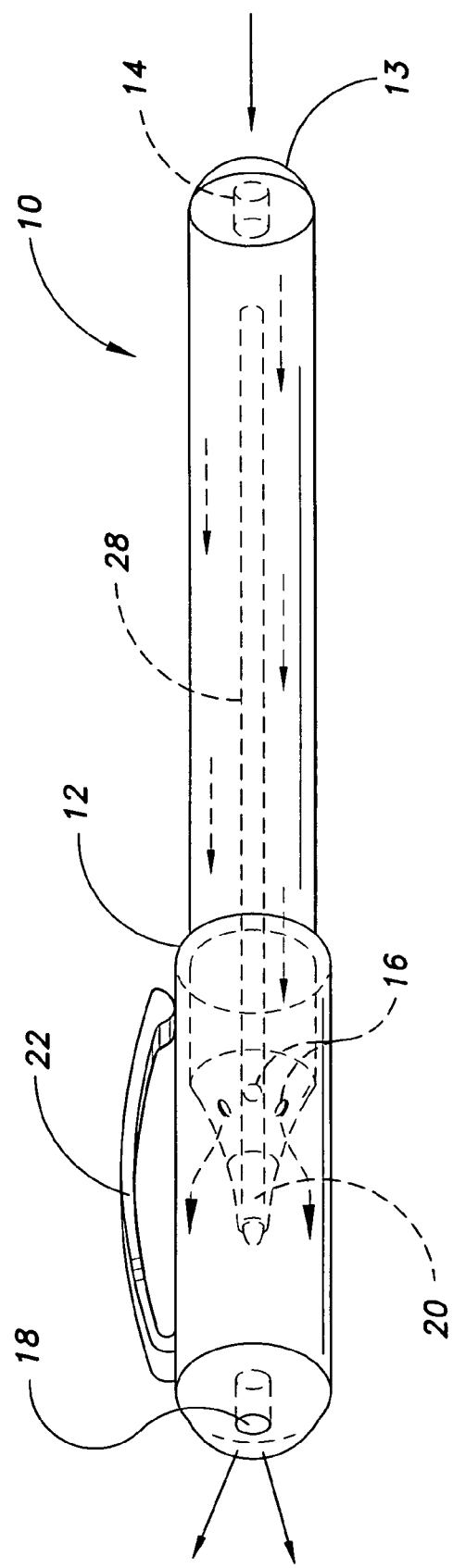
FIG. 3 is a side perspective view of a burp filtering device of FIG. 1 with the cap covering the exhaust end.
Figure 4:
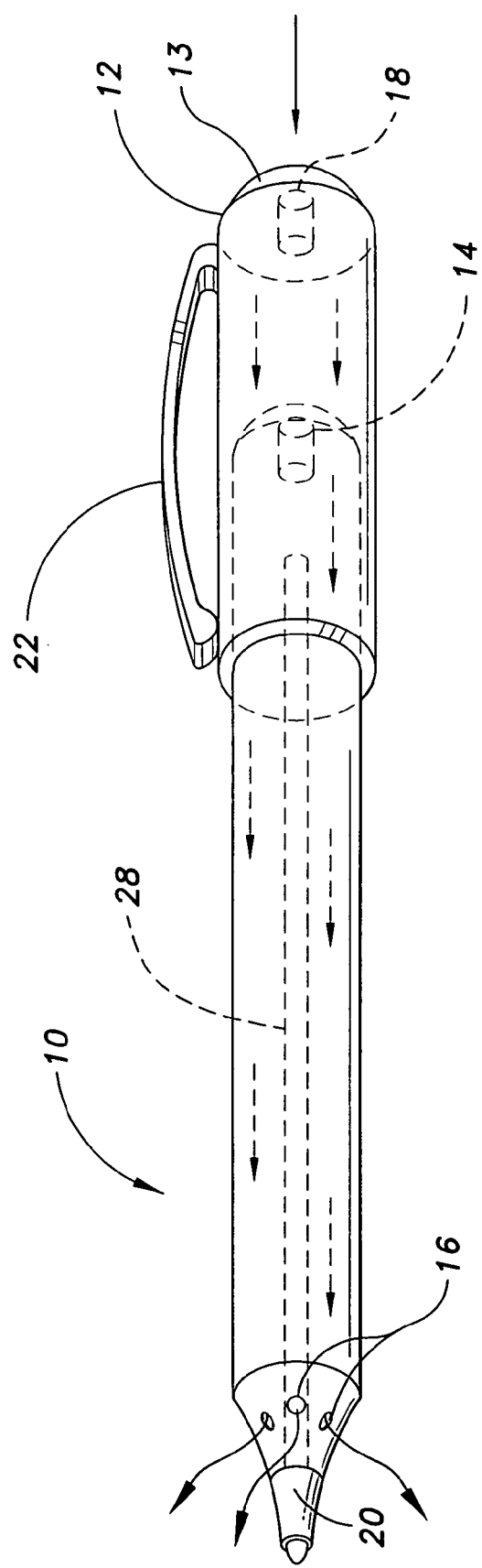
FIG. 4 is a side perspective view of a burp filtering device as in FIG. 1 with the cap stowed on the intake end.

Referring to FIGS. 2, 3, and 4, there is shown a burp-filtering and deodorizing pen 10 with a pen cap 12. The pen housing 11 is generally tubular to permit gas flow into its axial center cavity. There is an intake port 14 in the upper end cap 13 of the pen housing 11, and a plurality of exhaust ports 16 at the lower end of the pen housing 11. The user blows air or burp gas through the intake port 14, and the air or gas is filtered inside the pen housing 11. Filtered and deodorized air or gas flows out of the pen 10 through the plurality of exhaust ports 16. A writing tip 20 is fixed adjacent to and spaced below the plurality of exhaust ports 16. The writing tip 20 may be a ballpoint, felt tip, or other similar type of stylus. Ink is supplied to the writing tip 20 by an ink cartridge 28 that is attached to the writing tip and located inside the pen housing 11. As seen in FIG. 2, the interior space within the pen housing 11 and surrounding the ink cartridge 28 may be filled with gas filtering and deodorizing material 15 such as fibrous material.

FIG. 2 shows the pen cap 12 removed from pen housing 11, while FIG. 3 shows the pen cap 12 covering the lower end of the pen housing. The cap port 18 acts as one of the plurality of exhaust ports 16. The pen cap 12 does not interfere with airflow through the pen 10. FIG. 4 shows the pen cap 12 stored on the upper end of the pen housing 10. In this position, the cap port 18 acts as a supplemental intake port. The user blows the burp gas through the cap port 18 and from there the burp gas flows into the intake port 14 to be filtered and deodorized. In this manner, the placement of the pen cap 12 is not critical to the operation of the burp-filtering pen. In one embodiment, the pen cap 12 has a pocket clip 22 which may be used to clip the burp-filtering pen to the user's pocket or to prevent the burp-filtering pen from rolling down a slightly sloped table top.

Figure 5:
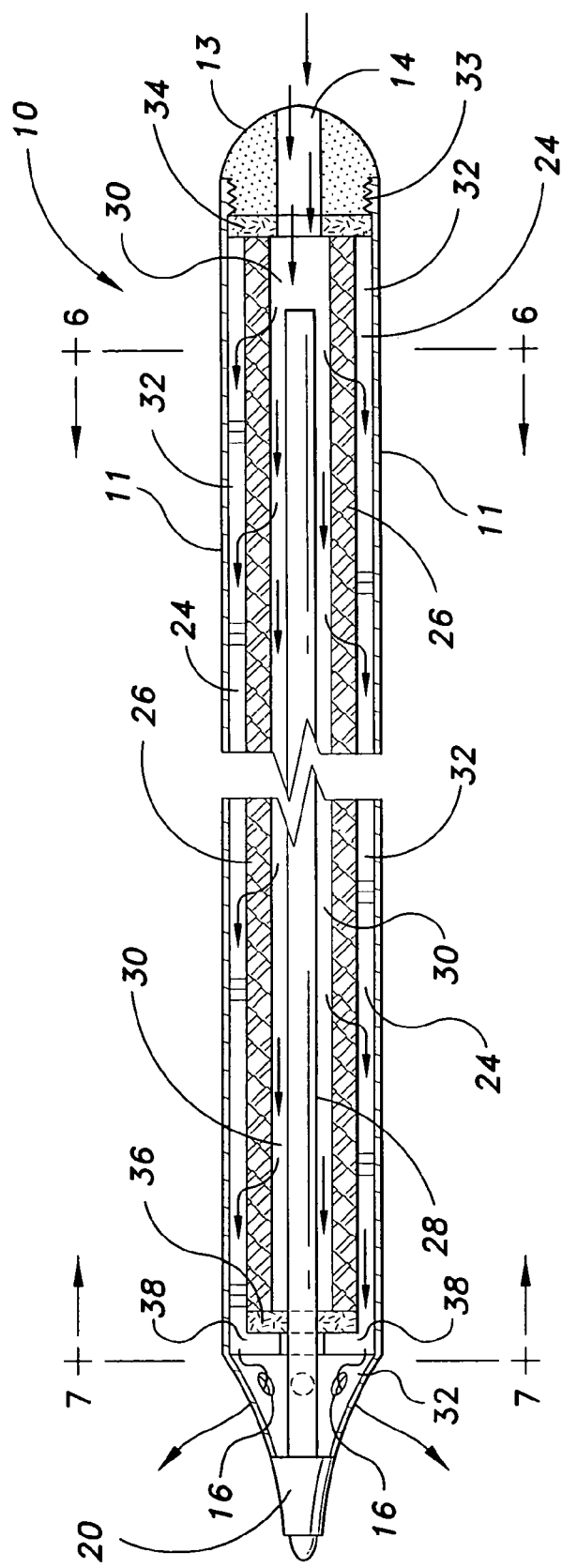
FIG. 5 is a fragmented, longitudinal, section view of a burp filtering device according to the present invention.

FIG. 5 shows a more detailed embodiment of pen 10 providing for a replaceable filter element. The pen housing 11 is generally tubular in configuration and the hollow space therein houses a plurality of vanes 24 extending radially inward from the housing 11 (shown in FIG. 6), a tubular filtration element 26, an axially disposed ink cartridge 28, an unfiltered air cavity 30 formed between filtration element 26 and ink cartridge 28, a filtered air cavity 32 formed in the annulus between filtration element 26 and housing 11, a washer-shaped intake sealing gasket 34, and a washer-shaped exhaust sealing gasket 36. The upper end cap 13 and the upper end portion of the pen housing 11 have interfitting screw threads 33, enabling the removal of the end cap 13, the replacement of filtration element 26, and the reattachment of upper end cap 13 to pen housing 11 by screwing action.

The user blows burp gas through an intake port 14 in upper end cap 13 at the upper end of the pen 10. The burp gas flows through the intake port 14 and the intake sealing gasket 34 and into the unfiltered air cavity 30. The intake sealing gasket 34 is fit between the upper end of the filtration element 26 and the upper end cap 13 to prevent unfiltered gas from entering the filtered air cavity 32 formed in the annular space between vanes 34 before going through the filtration element 26. In the preferred embodiment, the filtration element 26 is a tubular structure made of a filtering and deodorizing composition, such as activated charcoal. In the embodiment of FIG. 5, the filtration media is of microporous, self supporting material such as bound activated charcoal, porous ceramic, or sintered porous metal or other appropriate material effective to filter and deodorize the burp gas. The thickness of the filter wall may be varied depending on the type of filter material used.

Burp gas flows into the unfiltered air cavity 30 in the center of the tubular filtration media 26, but is blocked at the lower end of the pen housing 11 by the exhaust sealing gasket 36. In the embodiment of FIG. 5, the lower side of exhaust sealing gasket 36 is supported by vane gasket supports extending radially inward from vanes 24. Due to the modest pressure exerted by the user, the burp gas enters the filtration 26 and is filtered and deodorized. Upon exiting the filtration element 26, the odor-free burp gas is now in the annular filtered air cavity 32. The burp gas flows between the filtration element 26 and the pen housing 11 and vanes 24 to the plurality of exhaust ports 16, where it enters the atmosphere.

A writing tip 20 is fixed adjacent to the lower end of pen housing 11, spaced below the plurality of exhaust ports 16. The writing tip 20 is attached to an ink cartridge 28. The ink cartridge 28 supplies ink to the writing tip 20. The ink cartridge 28 is located in the unfiltered air cavity inside the hollow center of the tubular filtration element 26 its wall being sealed against closely fitting gasket 36 to avoid gas bypassing the filter element 26. The upper end cap 13 is inserted such that mechanical pressure is exerted through upper gasket 34 to filtration element 26 and thereby to lower gasket 36 and vane gasket supports 38 such as to slightly expand gasket 36 radially inward, thus assuring an effective seal and a secure seating of filtration element 26.

Figure 6:
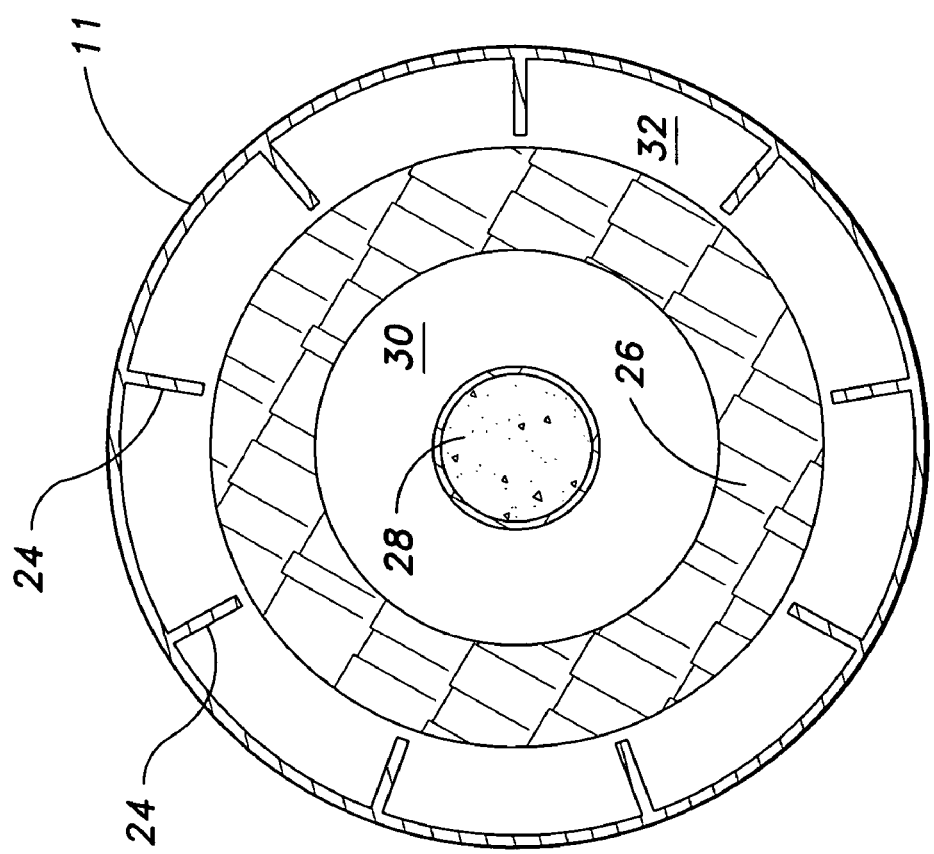
FIG. 6 is a transverse section view taken along lines 6—6 of the embodiment of FIG. 5, showing hidden features of a burp filtering device according to the present invention.

FIG. 6 is a section view of the embodiment of FIG. 5, showing the concentric arrangement of the features of the burp-filtering pen in the preferred embodiment. The pen housing 11 is generally tubular and has a plurality of radially extending vanes 24 which extend longitudinally along the inside wall of the housing. The plurality of vanes 24 serve to center the filtration element 26 and to provide a filtered air cavity 32. The filtration element 26 is a generally tubular element that separates the filtered air cavity 32 from the unfiltered air cavity 30. An ink cartridge 28 is axially centered within the filtration element 26 and the unfiltered air cavity 30. Thus, the gas-flow through the burp-filtering pen is properly controlled for maximum efficiency.

Figure 7:
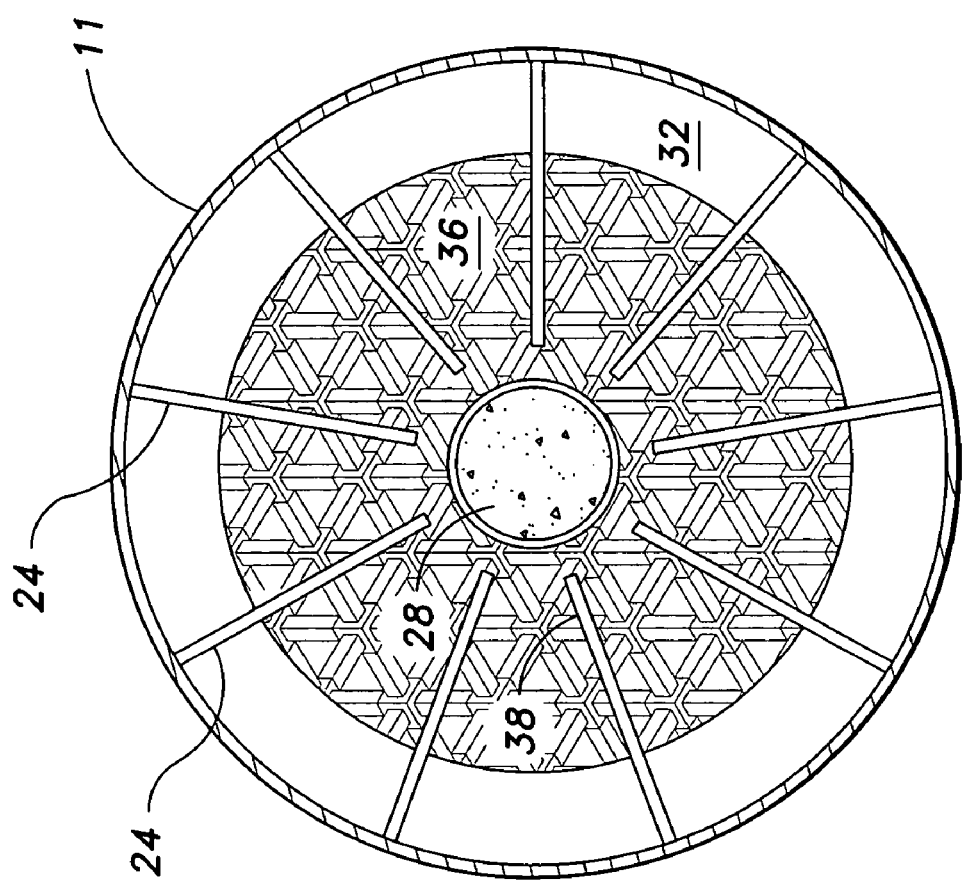
FIG. 7 is a transverse section view taken along lines 7—7 of the embodiment of FIG. 5, showing the tip end support vanes of a burp filtering device according to the present invention.

FIG. 7 shows the vane gasket supports 38 extending inward from the respective lower ends of vanes 24 for supporting lower outlet gasket 36 while allowing filtered and deodorized gas to escape to the tip 20 and through exhaust ports 16 (see FIG. 5).

Figure 8:
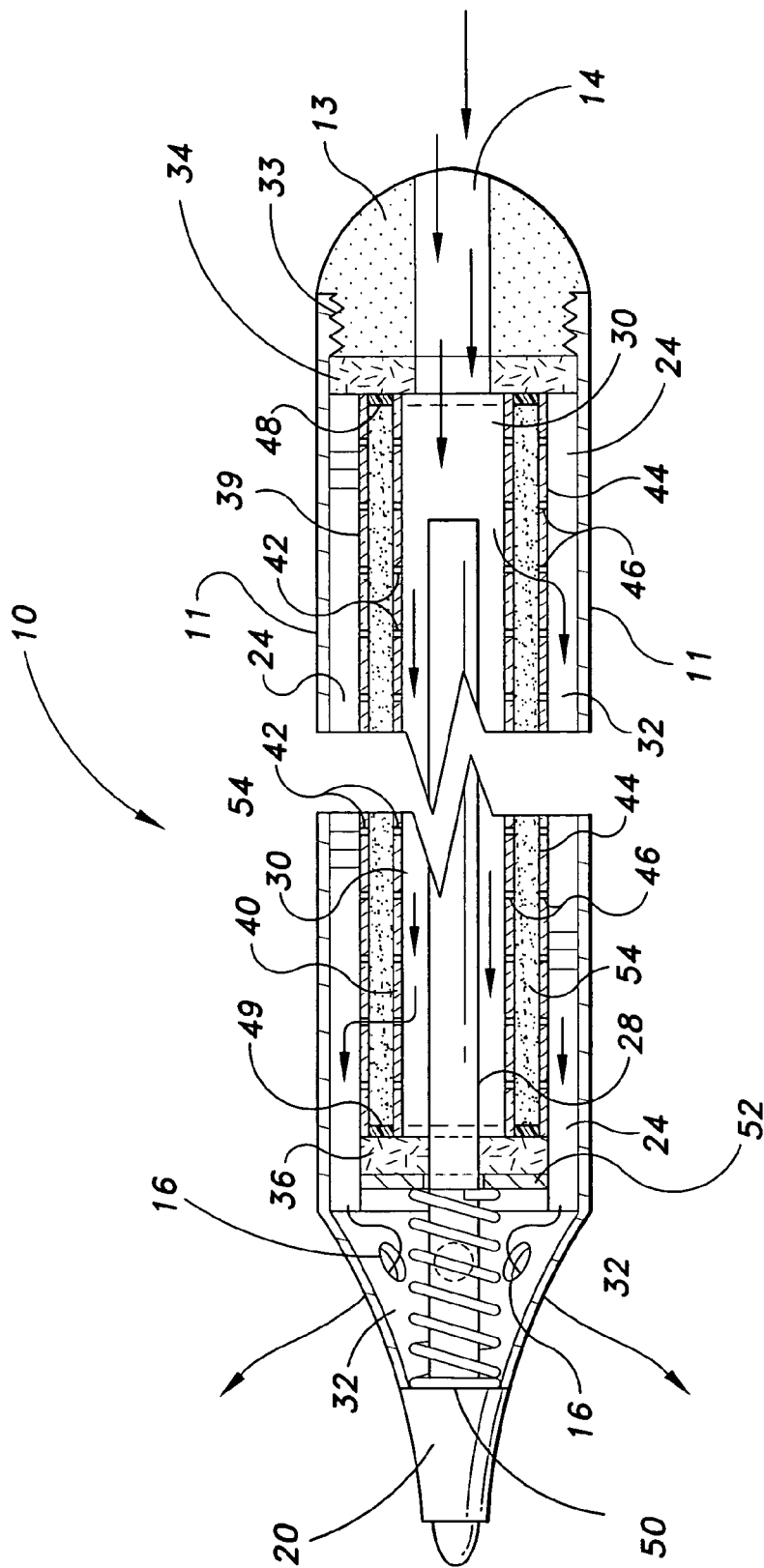
FIG. 8 is a fragmented, elongated sectional view similar to that of FIG. 5, having inner and outer perforated filter walls for supporting a granular filter medium.

Referring to FIG. 8, there is shown another embodiment of the invention wherein a filter element 39 has an inner wall 40 having perforations 42, a filter outer wall 44 having perforations 46, an upper end wall 48 and a lower end wall 49 and containing a disperse filter media such as granules 54 forming a filter element 39 similar to that of tubular filter element 26. The granules 54 may be of an adsorbing and absorbing material such as activated charcoal, or an adsorbing, absorbing, and chemical reaction material such as that described in a brochure entitled "Purifil Chemisorbant Media for removal of toxic, odorous, and Corrosive gasses," as published on the Purafil, Inc. Internet website, the granular material being obtainable from Purifil, Inc., Doraville, Ga. The granules 54 are preferably of at least such sized relative to perforations 42 and 46 as to not exit filter element 39.

Also shown in FIG. 8 is an alternative arrangement for supporting lower gasket 36 wherein spring 50 extends along the lower portion of ink cartridge 28 and extends between the upper wall of tip 20 and a metal washer 52, which, in turn, bears against the lower side of lower gasket 36. Upon the screwing in of upper end cap 13, spring 50 is compressed, providing a snug support system for filter element 39. This arrangement may be employed as an alternative to vane gasket supports 38 in the embodiment of FIG. 5, as described above. The vane gasket supports 38 of the embodiment of FIG. 5 may also be substituted for the spring and washer of FIG. 8, and of FIGS. 9 and 10 as discussed below.

Referring to FIG. 9, there is shown an embodiment of the invention similar to that of FIG. 8, having layered membrane filter media 56 such as layers of woven nano woven material. Such a material is described by Pasic et al. in U.S. Pat. No. 6,231,643, the disclosure of which is hereby incorporated by reference.

Referring to FIG. 10, there is shown an embodiment of the invention similar to that of FIG. 9, having a non-woven fibrous filter layer 58, such as that shown in FIG. 2, which may include nano non-woven material as described by Emig et al. in U.S. Pat. No 6,395,046 B1, the disclosure of which is hereby incorporated by reference.

The pen 10 may be constructed of conventional materials such as metal or plastic as desired.

It is to be understood that the present invention is not limited to the sole embodiments described above, but encompasses any and all embodiments within the scope of the following claims.

I claim:

1. A burp gas filtering and deodorizing device, comprising:
   a substantially elongated, tubular, generally cylindrical pen-shaped housing having an upper end and a lower end and defining a central axis;
   said upper end of the pen-shaped housing defining a gas intake port;
   said lower end of the pen-shaped housing defining at least one gas exhaust port;
   a writing tip attached to said lower end of the pen-shaped housing;
   an ink cartridge axially disposed within said pen-shaped housing to define an annular space therebetween, said ink cartridge being attached to said writing tip; and
   a gas filtration and deodorization media disposed within said pen-shaped housing, said gas filtration and deodorization media being disposed substantially within the annular space between said ink cartridge and said pen-shaped housing.

2. The burp gas filtering and deodorizing device according to claim 1, further comprising:
   a generally tubular pen cap removably attached to said lower end of the pen-shaped housing having an open end for receiving said pen-shaped housing and a closed end;
   said pen cap defining a cap port in the closed end of said pen cap.

3. The burp gas filtering and deodorizing device according to claim 1, wherein said filtration and deodorization media is a fibrous material.

4. The burp gas filtering and deodorizing device according to claim 1, further comprising an upper end cap located at said upper end of said pen-shaped housing, said upper end cap defining said gas intake port.

5. The burp gas filtering and deodorizing device according to claim 4, said filtration and deodorization media being a tubular filter element disposed in an annular cavity formed between said pen-shaped wall and said ink cartridge, said tubular filter defining an unfiltered gas cavity within said tubular filter and a filtered gas cavity in the annulus between said tubular filter and said pen-shaped housing, said device further comprising means for fixedly supporting said tubular filter within said pen-shaped housing such that said unfiltered gas cavity is in fluid communication with said gas intake port and said filtered gas cavity is in fluid communication with said at least one gas exhaust port.

6. The burp gas filtering and deodorizing device according to claim 5, wherein said upper end cap is threadingly engaged with said upper end of said pen-shaped housing so as to provide for its removable engagement therewith, and said tubular filter is removable and replaceable upon removal of said upper end cap.

7. The burp gas filtering and deodorizing device according to claim 6, wherein said means for fixedly supporting said tubular filter within said pen-shaped housing comprises an upper gasket and a lower gasket, said upper gasket being in the general shape of a washer and sealingly engaged between said upper end cap and said tubular filter, said upper gasket providing for fluid communication between said gas intake port and said unfiltered gas cavity, said lower gasket providing for fluid communication between said filtered gas cavity and said at least one gas outlet port.

8. The burp gas filtering and deodorizing device according to claim 7, wherein said means for fixedly supporting said tubular filter further comprises a plurality of spaced vanes extending lengthwise along the inner wall of said pen-shaped housing and extending radially inward therefrom within said annular filtered gas cavity so as to engage said tubular filter.

9. The burp gas filtering and deodorizing device according to claim 8, wherein said lower gasket is in the general shape of a washer having lower supporting means at said lower end of said pen-shaped housing, said lower gasket sealingly engaging the lower end of said tubular filter and said ink cartridge.

10. The burp gas filtering and deodorizing device according to claim 9, wherein said lower supporting means for said lower gasket comprises vane gasket supports extending radially inward from the respective lower ends of said spaced vanes.

11. The burp gas filtering and deodorizing device according to claim 10, wherein said lower end of said pen-shaped housing defines a plurality of spaced outlet gas ports radially spaced around said lower end of said pen-shaped housing and longitudinally spaced between said vane gasket supports and said tip.

12. The burp gas filtering and deodorizing device according to claim 10, wherein said lower supporting means for said lower gasket is a washer and a coil spring extending between said tip and said washer, said coil spring surrounding said ink cartridge.

13. The burp gas filtering and deodorizing device according to claim 12, wherein said lower end of said pen-shaped housing defines a plurality of spaced outlet gas ports radially spaced around said lower end of said pen-shaped housing and longitudinally spaced between said washer and said tip.

14. The burp gas filtering and deodorizing device according to claim 5, wherein said tubular filter element is self-supporting.

15. The burp gas filtering and deodorizing device according to claim 5, said tubular filter comprising an inner perforated wall and an outer perforated outer wall extending between an upper wall and a lower wall, and a filter media disposed between said inner wall and said outer wall and said end walls.

16. The burp gas filtering and deodorizing device according to claim 15, said filter media being granular in form.

17. The burp gas filtering and deodorizing device according to claim 16, said filter media being activated charcoal or chemisorbant media.

18. The burp gas filtering device according to claim 15, said filter media being layers of a nano woven membrane.

19. The burp gas filtering device according to claim 15, said filter media being selected from the group consisting of a disperse, fibrous material and a nano non-woven fibrous material.

* * * * *